J. H. Roundey,
Churn.
No. 66,042.   Patented June 25, 1867.
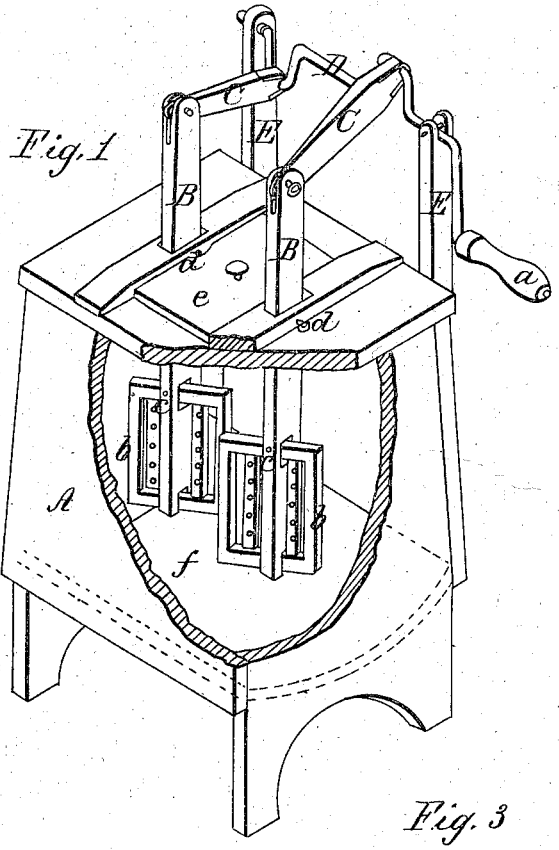
Fig. 1
Fig. 2
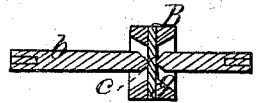
Fig. 3
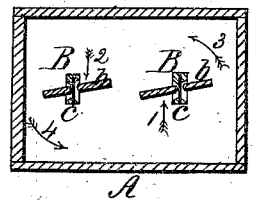
Witnesses,
B. H. Briesler
N. P. Peters
Inventor,
James H. Roundey
By T. W. Porter his Atty

United States Patent Office.

JAMES H. ROUNDEY, OF OLDTOWN, MAINE, ASSIGNOR TO HIMSELF AND AMOS H. ROUNDEY, OF THE SAME PLACE.

Letters Patent No. 66,042, dated June 25, 1867.

---

CHURN.

*The Schedule referred to in these Letters Patent and making part of the same.*

---

TO ALL WHOM IT MAY CONCERN:

Be it known that I, JAMES H. ROUNDEY, of Oldtown, in the county of Penobscot, and State of Maine, have invented a new and useful or improved Churn; and I do hereby declare that the following is a full, clear, and exact description of the construction and operation of the same, reference being had to the accompanying drawings, making a part of this specification, in which—

Figure 1 is a perspective view.

Figure 2 is a transverse section of one of the dashes; and

Figure 3 is a top or plan view, showing the action of the dashes.

Similar letters of reference indicate corresponding parts in the several figures.

The nature of my invention consists in a churn formed with a suitable receptacle for the cream, and provided with two alternating vibrating levers, pivoted near their centres, and actuated by a crank or other suitable device; also, a vibrating dash attached to and pivoted in each lever to act upon the cream in such manner as not only to produce agitation of the same but to constantly move that nearest the sides of the churn toward the centre, and *vice versa*.

In the drawings, A represents the body or hull of the churn, a portion being broken away to show the interior construction and arrangement. B B are two levers pivoted to the top of the churn at $d\ d$. C C are two connecting-rods attached to levers B B and the two throws of crank D, which latter has its bearings in standards E E secured to the back of the churn. $b\ b$ are the dashes, which may be of any suitable form. As shown, they are two square frames provided with perforated slats. These dashes are attached to the lower ends of levers B B loosely, as shown clearly in figs. 2 and 3, the mortise $g$, fig. 2, showing the extent of vibration allowed the dashes, which latter are pivoted to the levers in such manner that the part of the dashes between the levers is wider than that outside. The pins $e\ e$ serve as the pivot of the upper part of the dashes, and a similar pin passing up through the lower part of the dash-frame into levers B serves as the pivot of the lower part of the dashes.

In use, the churn is actuated by the crank-handle $a$, by revolving which the dashes are moved back and forth the width of the churn. The action of the dashes when in use is shown in fig. 3, their directions of movement being indicated by the arrows 1 and 2; and the dashes being pivoted off their centres, as before described, causes the wider part to swing to the rear, as shown in fig. 3, thus drawing the cream from the sides of the churn toward the centre and producing a rotary current, as indicated by arrows 3 and 4, which, as the dashes are reversed, increases the force of their contact with the cream. By thus pivoting the dashes with a wider and narrower side, and thereby producing currents oblique to the line of movement of the dashes, the cream is constantly changing positions relatively to the churn, thus securing an equalized contact of all its parts and the breaking effect of the dashes upon the same, and obviating one of the most serious defects in all square churns, which, in the language of dairy-women, has been that "the cream in the corners was not churned."

Having thus described my invention, what I claim as new, and desire to secure by Letters Patent, is—

1. The double vibrating dashes $b\ b$, when constructed and arranged to operate in manner substantially as and for the purposes specified.

2. The arrangement of churn A; the double vibrating dashes $b\ b$, and the vibrating levers B B, driven by crank D, or its equivalent, all arranged to operate in manner substantially as described and shown.

JAMES H. ROUNDEY.

Witnesses:
H. L. MITCHELL,
WM. STRANGE.